United States Patent

Kawakami

[11] Patent Number: 5,841,761
[45] Date of Patent: Nov. 24, 1998

[54] SYSTEM FOR DETECTING A CONNECTION STATE BETWEEN TWO NODES IN A DIGITAL COMMUNICATION NETWORK

[75] Inventor: Hiroyuki Kawakami, Tokyo, Japan

[73] Assignee: NEC Corporation, Tokyo, Japan

[21] Appl. No.: 571,712

[22] Filed: Dec. 13, 1995

[30] Foreign Application Priority Data

Dec. 13, 1994 [JP] Japan .................................. 6-309168

[51] Int. Cl.$^6$ ...................................................... H04J 3/14
[52] U.S. Cl. .......................... 370/248; 370/410; 370/438; 370/522; 340/825.06
[58] Field of Search ..................................... 370/351, 357, 370/384, 389, 400, 410, 426, 438, 439, 522, 524, 248, 249, 250, 251; 340/825.02, 825.03, 826, 827, 825.06, 825.16, 825.17; 379/212, 220, 221.271, 272, 273

[56] References Cited

U.S. PATENT DOCUMENTS

| | | | |
|---|---|---|---|
| 4,756,019 | 7/1988 | Szybicki | 379/112 |
| 4,763,329 | 8/1988 | Green | 340/825.02 |
| 4,930,119 | 5/1990 | Kobayashi et al. | 370/224 |
| 4,937,815 | 6/1990 | Lighthart | 370/439 |
| 4,991,204 | 2/1991 | Yamamoto et al. | 370/351 |
| 5,042,027 | 8/1991 | Takase et al. | 370/351 |

*Primary Examiner*—Alpus H. Hsu
*Attorney, Agent, or Firm*—Sughrue, Mion, Zinn, Macpeak & Seas, PLLC

[57] ABSTRACT

A system for determining whether or not two of a plurality of nodes (transmission devices) disposed in a complicated communication network, which includes control signal transmission paths and main signal transmission paths in a mixed condition, are physically connected to each other by a main signal transmission path so that setting to be performed by an operator can be performed precisely. In the system a large number of nodes, each having an intrinsic address set thereto and each having one or more ports, are connected to each other by a plurality of transmission paths by which digital signals are transmitted and each of the nodes relays a digital signal which arrives at one of the ports thereof to another one of the ports thereof. A specific bit of the digital signal is allocated as a bit for connection state retrieval.

14 Claims, 5 Drawing Sheets

SYSTEM FOR DETECTING A CONNECTION STATE BETWEEN TWO NODES IN A DIGITAL COMMUNICATION NETWORK

BACKGROUND OF THE INVENTION

1. Field of the Invention:

This invention relates to a digital communication network, and more particularly to automatic detection of a connection state between two nodes in a time-division multiplex transmission network.

2. Description of the Related Art:

Conventionally, a method of automatically detecting a connection state between two nodes in a transmission network in a digital communication network is not known. Accordingly, either an operator performs operations in accordance with various procedures while referring to a system constructive diagram, or information of connection state is inputted to and stored in a data base in advance and retrieved data from the data base are referred to when an operation is performed.

In a recent transmission network, the number of operating nodes in a transmission network is very large because accessing to a remote device is available by way of a device (node). Further, an increase in number of ports for communication in each node, a redundancy construction of a main signal transmission path aimed at improvement in reliability and employment of a plurality of kinds of ports for control signal transmission required for one device (for example, a main signal transmission path for transmitting a control signal and a main signal and a control signal transmission path for exclusive use for a control signal) make it difficult to obtain connection state between nodes.

Therefore, setting operations for setting timing sources to be used by a very large number of nodes and for setting various items which must be set to obtain connection states (particularly whether or not nodes are directly connected to each other by a main signal transmission path) such as control of the transmission delay time between two nodes may possibly give rise to an operational error.

Also another method is available wherein information of connection state is inputted to and stored in a data base in advance and, when a relating operation is performed, the stored information of connection state is referenced to avoid setting in error. This method, however, is still disadvantageous in that human error may occur when the data base is updated or the scale of the data base is increased very much. Further, when information of connection state cannot be inputted to the data base in advance, the operator must obtain the information. Since the memory of the operator is relied upon, there is another disadvantage in that inappropriate setting is liable to be performed.

SUMMARY OF THE INVENTION

The present invention has been made based on the background described above, and it is an object of the present invention to provide a connection state detection system wherein it can be confirmed whether or not two arbitrary nodes disposed in a digital communication network of a complicated network construction are directly connected to each other by a main signal transmission path so that inappropriate setting by an operator can be prevented.

The present invention is characterized in that a specific bit of a digital signal of the frame type is allocated as a bit for connection state retrieval and it is confirmed from the specific bit whether or not two arbitrary nodes are directly connected to each other by a main signal transmission path.

In particular, according to the present invention, a system for detecting a connection state between two nodes in a digital communication network includes a plurality of nodes, each node having an intrinsic address set thereto and each node having one or more ports, and a plurality of transmission paths for connecting the nodes to each other; the transmission paths include main signal transmission paths for transmitting a control signal and a main signal, and control signal transmission paths for exclusively transmitting a control signal; the main signal transmission paths transmits a digital signal; each of the nodes relays a digital signal which arrives at one of the ports thereof to another one of the ports thereof. The present system is constructed such that a specific bit of the frame type digital signal is allocated as a bit for connection state retrieval, and each of the nodes includes means for inhibiting relaying of the specific bit.

Preferably, the system comprises a CPU capable of accessing all of the nodes, and the CPU includes means for accessing a transmitting one of the nodes to set "significant" to the specific bit of a transmitting digital signal of the transmitting node and also includes means for detecting whether or not the specific bit of a received digital signal of a receiving one of the nodes is "significant" to detect whether or not a directly connected transmission path is present between the transmitting node and the receiving node;

The means for detecting includes means for canceling the "significant" at the specific bit set each time detection of presence or absence of a direct connected transmission path is completed for a combination of two nodes;

The CPU includes means for accessing two arbitrary the nodes to get information of connection state in the communication network; and/or when the frame type is the standard E1 frame, the specific bit is selected as one of spare bits.

The plurality of nodes each having an intrinsic address set thereto and each having one or more ports are connected to each other by the plurality of transmission paths, and a digital signal of the frame type is transmitted in the transmission paths. A specific bit of the frame type digital signal transmitted in this manner is allocated as a bit for connection state retrieval, and upon relaying transfer, relaying of the specific bit is inhibited.

The CPU capable of accessing all of the nodes accesses a transmitting node, whose connection condition is to be confirmed and sets "significant" (for example, "1") to the specific bit of a transmitting digital signal, and detects whether or not the specific bit of a received digital signal of the receiving node is a "significant" value to detect whether or not a direct connected transmission path is present between the two nodes (that is, the transmitting node and the receiving node).

In the detection, each time detection of presence or absence of a direct connected transmission path is completed for a combination of two nodes, the "significant" at the specific bit set to the transmitting node is canceled.

When the frame type is the standard E1 frame, the specific bit is selected to a spare bit.

Consequently, since it can be confirmed whether or not two arbitrary nodes in the transmission network are directly connected to each other by a main signal transmission path, otherwise possible connection setting to an inappropriate device by an operator can be prevented.

According to the present invention, a connection state between two arbitrary nodes can be detected in a minimized time without having information of connection state in advance stored as a data base.

DESCRIPTION OF THE PREFERRED EMBODIMENT

Figure 1:
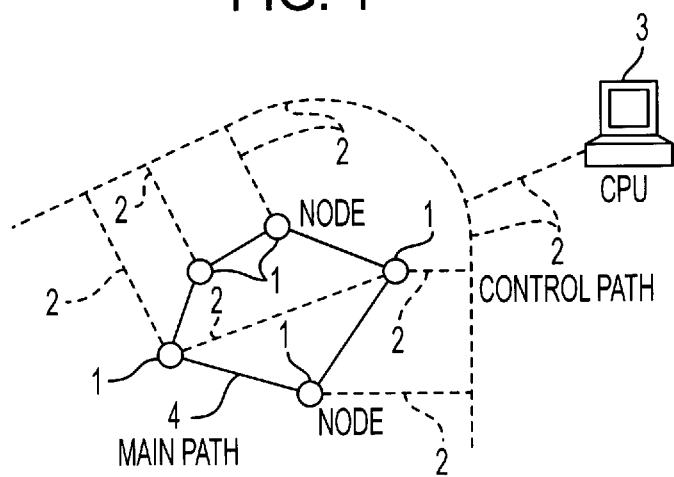
FIG. 1 is a diagrammatic view showing a construction of an entire digital communication network according to an embodiment of the present invention.
Figure 2:
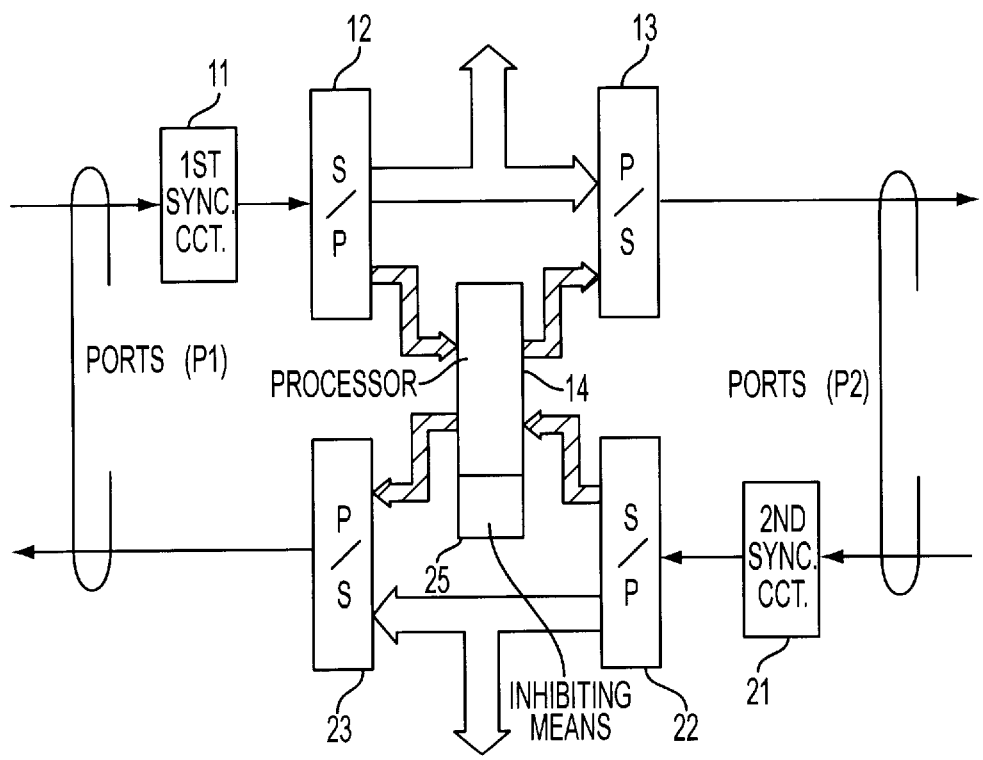
FIG. 2 is a block diagram showing a construction of relay means provided in each node in one embodiment of the present invention.
Figure 3:
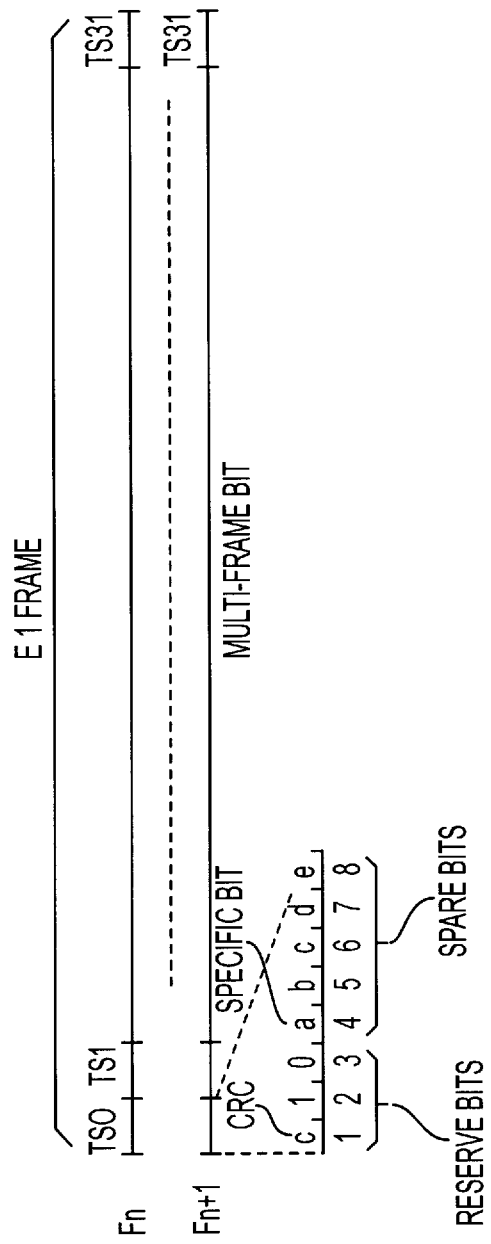
FIG. 3 is a diagrammatic view showing a construction of a frame type digital signal in one embodiment of the present invention.

In the following, an embodiment of the present invention is described with reference to the drawings. FIG. 1 is a diagrammatic view showing a construction of an entire digital communication network according to an embodiment of the present invention, FIG. 2 is a block diagram showing a construction of relay means provided in each node in the embodiment of the present invention, and FIG. 3 is a diagrammatic view illustrating allocation to the standard E1 frame of a specific bit for connection state retrieval in an embodiment of the present invention.

An embodiment of the present invention includes a large number of nodes 1 each having an intrinsic address set thereto and each having one or more ports, and a large number of transmission paths 2,4 for connecting nodes 1 to each other. A digital signal is transmitted by transmission paths 2. Each of nodes 1 includes relay means for relaying a digital signal arriving at one of the ports thereof to another one of the ports. Here, the present invention is characterized in that a specific bit of a digital signal is allocated as a bit for connection state retrieval and the relay means includes means for inhibiting 25 relaying of the specific bit.

The embodiment of the present invention further includes CPU 3 which can access all of nodes 1. CPU 3 includes means for accessing a transmitting node to set a "significant" value to the specific bit of a transmitting digital signal, and detection means for detecting whether or not the "significant" is present at the specific bit of a received digital signal of a receiving node to detect whether or not there is a directly connected transmission path between the transmitting node and the receiving node. The detection means includes means for canceling the "significant" value at the specific bit set to the transmitting node each time retrieval of presence or absence of a direct connected transmission path 2 is completed for combination of two nodes 1, and CPU 3 includes means for accessing two arbitrary nodes and holding information of connection state in the communication network. When the digital signal is the standard E1 frame type digital signal, the specific bit is allocated to one of the spare bits.

Next, the construction of the entire digital communication network is described. As shown in FIG. 1, transmission paths 2 each indicated by a broken line serve as control signal transmission paths which exclusively transmit a control signal, and main signal transmission paths 4 indicated by solid lines connect nodes 1 to each other and serve as main signal transmission paths for transmitting a control signal and a main signal. Nodes 1 are connected to each other by way of both or one of main signal transmission path 4 and transmission path 2 as seen in FIG. 1.

Meanwhile, as shown in FIG. 2, the relay means includes port (P1) and port (P2), first synchronous circuit 11 connected to the input side of port (P1), first serial/parallel convertor 12 for receiving an output from first synchronous circuit 11 and performing serial/parallel conversion of the received output, first parallel/serial convertor 13 connected to the output side of port (P2) for performing parallel/serial conversion, second synchronous circuit 21 connected to the input side of port (P2), second serial/parallel convertor 22 for receiving an output from second synchronous circuit 21 and performing serial/parallel conversion of the received output, second parallel/serial convertor 23 connected to the output side of port (P1) for performing parallel/serial conversion, and processor section 14 for processing digital signals from first serial/parallel convertor 12 and second serial/parallel convertor 22 and sending out resulted signals to first parallel/serial convertor 13 and second parallel/serial convertor 23. Processor section 14 processes control data as seen from FIG. 2 and is formed from a CPU.

In a frame type digital signal on any of the main signal transmission paths in an embodiment of the present invention, where the transmission rate between nodes 1 is, for example, 2.048 Mbps (E1 frame) as seen in FIG. 3, the specific bit for connection state retrieval is allocated to bit 4(a) from among the spare bits in the TS0 (time slot 0). For example, in an ordinary condition, the specific bit has the value of "1", but when a connection is to be checked, the specific bit can be set to "0" (significant). A bit for a control signal is allocated to another bit, for example, to the bit 8(e).

Figure 4:
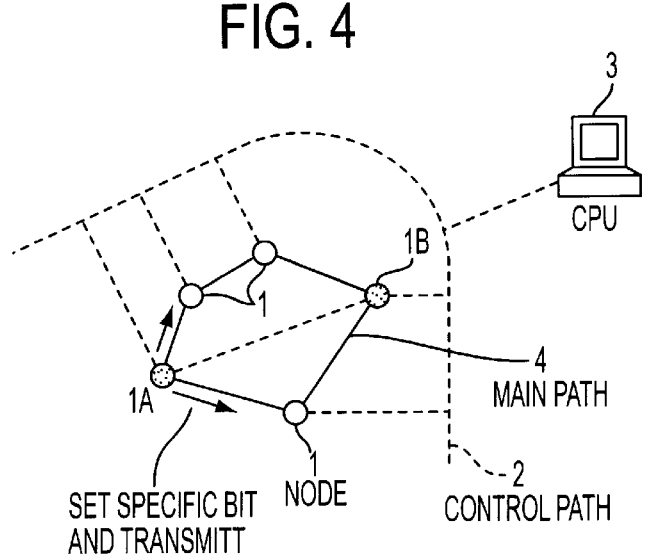
FIG. 4 is a diagrammatic view showing an example of a construction when a node in the embodiment of one present invention whose connection condition is to be confirmed is not connected by a main signal transmission path.

In the following, operation of an embodiment of the present invention having the construction described above is described.

Where a node whose connection condition is to be confirmed is not connected by a main signal transmission path as seen in FIG. 4, in order to determine whether or not two nodes 1A and 1B in the communication network are directly connected to each other by a main signal transmission path 4. CPU 3 operates a specific bit outputted from all ports of node 1A to collect information regarding whether or not node 1B receives a variation of the outputted specific bit. If it is detected that node 1B receives no variation of the specific bit, this signifies that nodes 1A and 1B are not directly connected to each other by a main signal transmission path. In particular, in the condition shown in FIG. 4, since node 1B whose connection state is to be confirmed is not connected by any main signal transmission path, even if the specific bit in the outputs of all of the ports of node 1A is operated and sent out to neighboring nodes, no relaying from the neighboring nodes is performed, and consequently, node 1B cannot receive a variation of the bit.

Figure 5A:
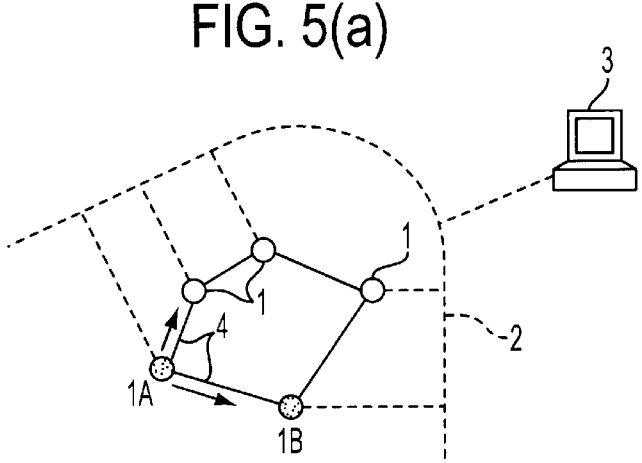
FIG. 5(a) is a diagrammatic view illustrating a condition wherein a node in the embodiment of one present invention whose connection condition is to be confirmed is connected by a main signal transmission path and a specific bit in the outputs of all ports of a connecting node is operated and sent out.
Figure 5B:
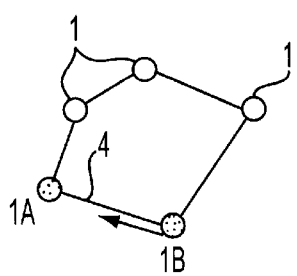
FIG. 5(b) is a diagrammatic view illustrating a condition wherein the connecting node receives and sends out a specific bit.

On the other hand, when node 1B receives a variation of the specific bit only at one port thereof as seen in FIG. 5(a), that is, when node 1B whose connection state is to be confirmed is connected by one of main signal transmission paths 4, CPU 3 operates the specific bit in the outputs of all of the ports of node 1A and also sends it out to neighboring nodes, and operates the specific bit of the port of node 1B which has received the specific bit as seen in FIG. 5(b) to collect information regarding whether or not node 1B has received a variation of the specific bit from node 1A.

Figure 6A:
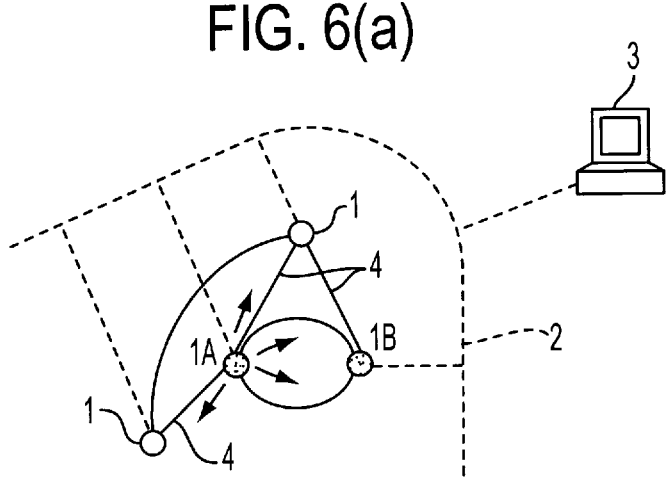
FIG. 6(a) is a diagrammatic view of one embodiment of the present invention illustrating a condition wherein a node in a complicated communication network whose connection condition is to be confirmed operates and sends out a specific bit in the outputs of all ports to a connecting node.
Figure 6B:
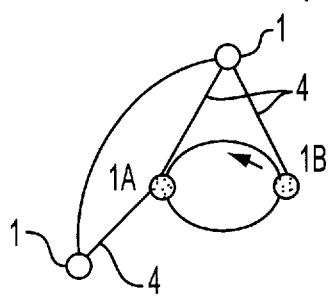
FIG. 6(b) is a diagrammatic view illustrating a condition wherein the connecting node receives a variation of a specific bit at a plurality of ports thereof and operates and sends out a specific bit from one of the ports thereof.
Figure 6C:
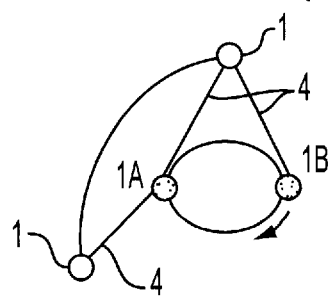
FIG. 6(c) is a similar view illustrating another condition wherein the connecting node successively operates and sends out a specific bit of the ports.

Further, when node 1B receives a variation of the specific bit at a plurality of ports thereof as seen in FIG. 6(a), CPU 3 operates the specific bit at one of the receiving ports of node 1B (refer to FIG. 6(b)) to collect information regarding whether or not a variation of the particular bit has been received from node 1A. Further, CPU 3 successively performs operation of the specific bit for the remaining ports of node 1B at which a variation of the specific bit has been received one port by one port (refer to FIG. 6(c)) to collect corresponding information of a variation of the specific bit from node 1A. The reason why the specific bit at node 1B is operated one port by one port is that it is intended to confirm connection information in units of a port. In such a retrieval step as described above, since the specific bit is changed, upon connection checking, to "0", the operated bit is returned to "1" when the confirmation of reception is completed with the connecting node. Consequently, only by preparing one bit as a specific bit, can CPU 3 retrieve a connection state of two arbitrary nodes 1A and 1B in the complicated communication network.

Figure 7A:
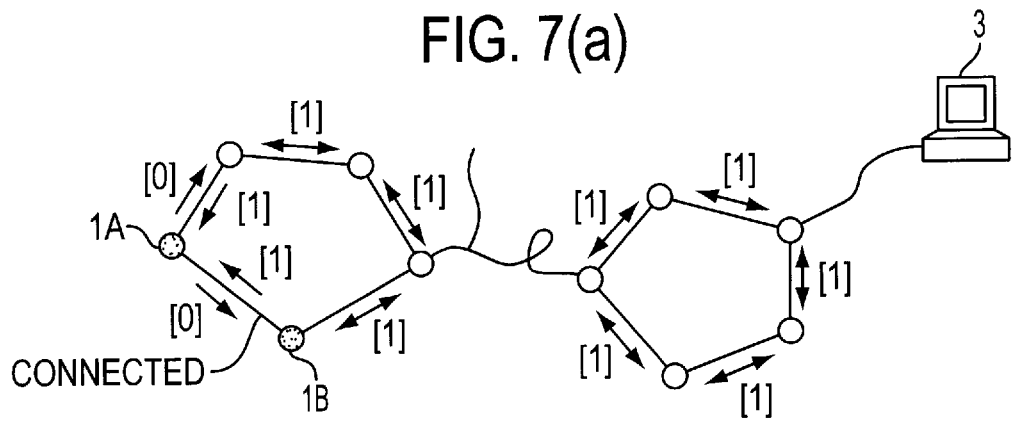
FIGS. 7(a) to 7(c) are diagrammatic views showing an example of a construction and illustrating presence or absence of a connection of a digital communication network in one embodiment of the present invention.
Figure 7B:
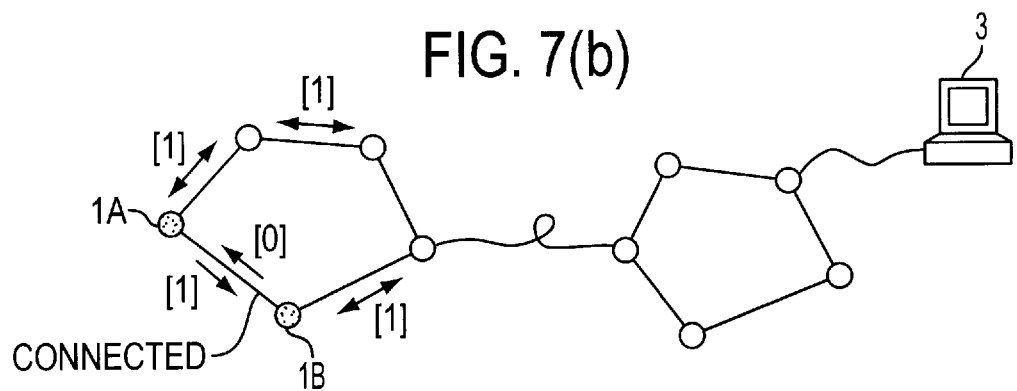
Figure 7C:
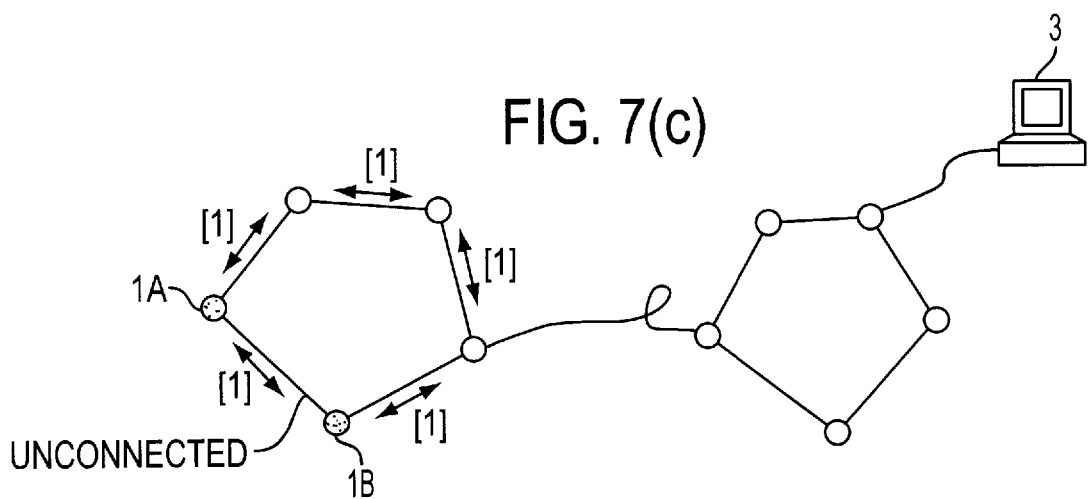

FIGS. 7(a), 7(b) and 7(c) show another example of a communication network according to an embodiment of the present invention and illustrate an outline wherein a connection state between nodes 1A and 1B is discriminated based on "0" or "1" of a specific bit for connection state retrieval allocated to a main signal transmission path.

As described above, according to the present invention, it can be confirmed whether or not two arbitrary nodes (transmission devices) in a complicated time-division multiplex communication network which include control signal transmission paths and main signal transmission paths in a mixed condition are directly connected to each other by a main signal transmission path, and consequently, otherwise possible connection setting to an inappropriate device by an operator can be prevented. Further, retrieval and analysis of a connection state of the communication network are performed restrictively for the two nodes, connection confirmation can be realized by a simple algorithm.

According to the present invention, a connection state between two arbitrary nodes can be detected in a minimized time without having information of connection state in advance stored as a data base.

What is claimed is:

1. A system for detecting a connection state between nodes in a digital communication network comprising:

a plurality of nodes for transmitting and receiving digital signals, each of said nodes having at least one port, and a plurality of transmission paths for connecting said nodes to each other, said transmission paths carrying digital signals, each node configured to relay said digital signals which arrive at a first port of said node to another port of said node;

said system further comprising a means for setting a transmit value of a specific bit of a transmitting digital signal;

each of said nodes having a detector for detecting a received value of said specific bit of a received digital signal, the received value of said specific bit being indicative of whether a transmission path connection exists between one of said nodes and another of said nodes; and a CPU including a means for accessing each of said plurality of nodes to set the transmit value of the specific bit of a transmitting digital signal.

2. A system of detecting a connection state between nodes in a digital communication network as claimed in claim 1, wherein said system further comprises:

said CPU including a means for detecting the specific bit of a digital signal received at one of said nodes to determine whether or not the received value of the specific bit indicates that a connected transmission path is present between one of said nodes and another of said nodes.

3. A system of detecting a connection state between nodes in a digital communication network as claimed in claim 2, wherein said means for detecting includes means for canceling the transmit value set to the specific bit each time retrieval of presence or absence of a connected transmission path is completed for a combination of two of said nodes.

4. A system for detecting a connection state between nodes in a digital communication network as claimed in claim 3, wherein said CPU includes means for accessing two arbitrary ones of said nodes to determine a connection state in the communication network.

5. A system of detecting a connection state between nodes in a digital communication network as claimed in claim 4, wherein, when the digital signal is a standard E1 frame type digital signal, the specific bit is allocated to a spare bit.

6. A system of detecting a connection state between nodes in a digital communication network as claimed in claim 3, wherein, when the digital signal is a standard E1 frame type digital signal, the specific bit is allocated to a spare bit.

7. A system for detecting a connection state between nodes in a digital communication network as claimed in claim 2, wherein said CPU includes means for accessing two arbitrary ones of said nodes to determine a connection state in the communication network.

8. A system of detecting a connection state between nodes in a digital communication network as claimed in claim 7, wherein, when the digital signal is a standard E1 frame type digital signal, the specific bit is allocated to a spare bit.

9. A system of detecting a connection state between nodes in a digital communication network as claimed in claim 2, wherein, when the digital signal is a standard E1 frame type digital signal, the specific bit is allocated to a spare bit.

10. A system of detecting a connection state between nodes in a digital communication network as claimed in claim 1, wherein, when the digital signal is a standard E1 frame type digital signal, the specific bit is allocated to a spare bit.

11. A system of detecting a connection state between nodes in a digital communication network as claimed in claim 1, wherein the received value of said specific bit indicates a connected transmission path when said received value is a variation of the transmit value of said specific bit.

12. A system of detecting a connection state between nodes in a digital communication network as claimed in claim 1, wherein each of said nodes includes a means for inhibiting relay of the transmit value of said specific bit.

13. A system for the detecting a connection state between nodes in a digital communication network comprising:

- a plurality of nodes for transmitting and receiving digital signals, said nodes connected by a plurality of transmission paths;
- a CPU for accessing each of said nodes, said CPU configured to set a significant value to a specific bit of a digital signal for transmission from one of said nodes;
- each of said nodes having a plurality of communication ports and a relay for transmitting said digital signal through said plurality of communication ports; and
- each of said nodes having a processor which determines whether one of said node has received a variation of said significant value within a received digital signal, wherein receiving of said variation of said significant value indicates that a connection path exists between said one of said nodes and another of said nodes.

14. A system of detecting a connection state between nodes in a digital communication network as claimed in claim 13, wherein, when the digital signal is a standard E1 frame type digital signal, the specific bit is allocated to a spare bit.

* * * * *

UNITED STATES PATENT AND TRADEMARK OFFICE
CERTIFICATE OF CORRECTION

PATENT NO. : 5,841,761
DATED : November 24, 198
INVENTOR(S) : Hiroyuki KAWAKAMI

It is certified that error appears in the above-identified patent and that said Letters Patent is hereby corrected as shown below:

Column 2, line 31, delete "the".

Column 3, line 12, delete "the embodiment of one" and insert --one embodiment of the--

Column 3, line 17, delete "the embodiment of one" and insert --one embodiment of the--

Column 3, line 65, delete "25".

Column 4, line 51, delete "TSO" and insert --TSO--.

Column 5, line 36, delete "only by" and insert --by only--.

Column 5, line 37, delete "can CPU 3" and insert --CPU 3 can--.

Signed and Sealed this

Twenty-ninth Day of June, 1999

Attest:

Q. TODD DICKINSON

*Attesting Officer*     *Acting Commissioner of Patents and Trademarks*